(No Model.)
C. ENNIS.
PROTECTIVE DEVICE FOR METER COUPLINGS.
No. 602,982. Patented Apr. 26, 1898.
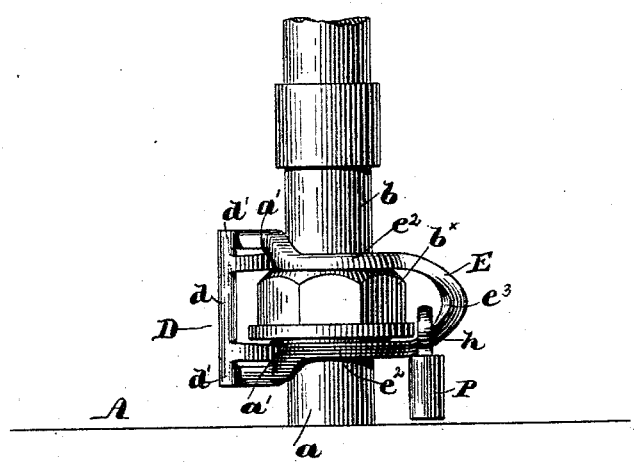
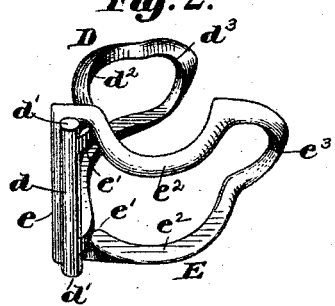
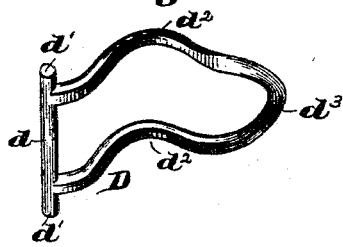
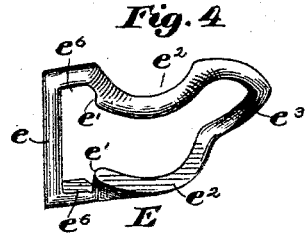
Witnesses:
Walter E. Lombard.
Thomas J. Drummond.
Inventor:
Charles Ennis,
by Crosby & Gregory
Attys.

UNITED STATES PATENT OFFICE.

CHARLES ENNIS, OF BOSTON, MASSACHUSETTS, ASSIGNOR OF ONE-HALF TO PAUL A. MANN, OF SAME PLACE.

PROTECTIVE DEVICE FOR METER-COUPLINGS.

SPECIFICATION forming part of Letters Patent No. 602,982, dated April 26, 1898.

Application filed June 7, 1897. Serial No. 639,634. (No model.)

*To all whom it may concern:*

Be it known that I, CHARLES ENNIS, of Boston, in the county of Suffolk and State of Massachusetts, have invented an Improvement in Protective Devices for Meter-Couplings, of which the following description, in connection with the accompanying drawings, is a specification, like letters on the drawings representing like parts.

This invention has for its object the production of a simple and effective detachable protective device specially adapted for gas-meter couplings, to be applied to the coupling and locked or sealed in place to prevent tampering with the connection or to indicate such tampering therewith.

Some forms of gas-meter are provided with a tubular boss having a threaded head, to which the house-pipe is connected by a suitable coupling, and it is the practice of some gas companies to insert a plug in the connection to prevent the passage of gas when for any reason it is desired to prevent the use of gas without removing the meter.

By the use of my invention tampering with and uncoupling the connection may be absolutely prevented or such tampering will be clearly indicated, according to whether the protective device is locked or sealed in place.

Figure 1 represents a meter connection or coupling with my invention applied thereto and locked in place. Fig. 2 is a perspective view of the protective device detached, and Figs. 3 and 4 are perspective views of the two coöperating members thereof.

The top A of the meter is provided with a tubular boss $a$, having a threaded head $a'$, which is connected with the end $b$ of the house-pipe by a suitable interiorly-threaded coupling nut or collar $b^\times$, and by loosening the coupling-nut a plug may be inserted in either the boss $a$ or the pipe $b$ to prevent passage of gas to the house system, the coupling $b^\times$ being then screwed into place on the head $a'$.

To prevent loosening of the coupling by unauthorized persons and subsequent removal of the plug, so that gas may be used, I have provided a detachable protective device (shown separately in Fig. 2) comprising two members D E, adapted to interlock at one end and form a hinge connection and to surround the boss $a$ and the house-pipe $b$, with the coupling member or nut $b^\times$ restrained thereby from movement sufficient to uncouple the parts.

The member D is shown as an open link having a straight upright end $d$ extended to form projecting lugs $d'$, the sides of the link being bent or curved outwardly at $d^2$ and then contracted to form a loop $d^3$ at the other end and substantially in the plane of the end $d$. The member E is also shown as an open link having a straight upright end $e$, the sides of the link being also bent or curved outwardly at $e^2$ and terminating in a loop $e^3$ in the plane of the straight end $e$; but between the end $e$ and the curved portions $e^2$ the link is widened at $e^6$, leaving shoulders $e'$.

The distance between the upper and lower sides of each member at the curved portions is sufficient to embrace the coupling-nut $b^\times$ (see Fig. 1) and the lower side of the head $a'$ of the boss $a$.

In use the member D is passed through the member E at the widened parts $e^6$ until the shoulders $e'$ bear against the sides of the member D adjacent the straight end $d$ thereof, while the lugs $d'$ prevent separation of the members when the device is in use. The curved portions $d^2 e^3$ of the members embrace the boss and house-pipe above and below the coupling-nut $b^\times$ and head $a'$, as shown in Fig. 1, the loop-like ends $d^3$ and $e^3$ being brought close together at such time to receive the hasp $h$ of a padlock P, or, if desired, a suitable wire seal may be passed through them. The members D and E are thus pivotally connected or hinged together, as it were, by the interlocking straight ends $d$ and $e$.

When the clamp is in place, the coupling-nut cannot be unscrewed, because the upper and lower sides of the members D and E extend across the top of said nut and below the head $a'$ of the boss, respectively, and if the protective device is locked on tampering with the coupling is effectually prevented.

If the device is merely sealed in place, the seal must be fractured or broken before the coupling can be operated, and hence the condition of the seal will at once show that the coupling has been tampered with.

The members of the protector may be made from cast metal, or they may be made of heavy stiff wire, if desired.

Obviously the protective device may be applied to any form of coupling similar to that herein shown, whether in connection with a gas-meter or some other device.

My invention is not restricted to the precise construction and arrangement herein shown, as the same may be varied or modified without departing from the spirit and scope of my invention.

Having fully described my invention, what I claim, and desire to secure by Letters Patent, is—

1. A detachable protective device for couplings, comprising two separable members outwardly curved between their ends, and each having a straight, bar-like end, one of the members being increased in width and open adjacent said straight end to permit the passage therethrough of the other member, the latter member having projecting lugs at its straight end, to coöperate with and prevent withdrawal from the former member, substantially as described.

2. A detachable protective device for couplings, comprising two separable members, one of which is adapted to pass through the other and be pivotally interlocked at one end, and shaped to surround the coupling, the free ends of said members forming open loops adapted to be brought together substantially in the plane of the pivot to retain the device in place on the coupling, substantially as described.

3. A detachable protective device for couplings, comprising two open members bent outwardly between their ends, and each having a straight, bar-like end, one of the members being increased in width adjacent said straight end to permit the passage therethrough of the other member, the latter member having projecting lugs at its straight end, to coöperate with and prevent withdrawal from the former member, substantially as described.

In testimony whereof I have signed my name to this specification in the presence of two subscribing witnesses.

CHARLES ENNIS.

Witnesses:
JOHN C. EDWARDS,
AUGUSTA E. DEAN.